Patented Jan. 10, 1928.

1,655,870

UNITED STATES PATENT OFFICE.

LEONARD ANGELO LEVY, OF LONDON, ENGLAND.

PROCESS FOR THE MANUFACTURE OF CELLULOSE ACETATE.

No Drawing. Application filed April 4, 1925, Serial No. 20,866, and in Great Britain April 9, 1924.

My invention relates to an improved process for the manufacture of cellulose acetate by the treatment of cellulose or modified cellulose with an acetylating mixture consisting of acetic anhydride, acetic acid and a condensing agent, such as sulphuric acid.

Now, I have found by experiment that by the addition to the acetylating mixture of a metallic catalyst consisting of a salt of chromium, the acetylation process is considerably promoted and the acetone soluble product as finally obtained is in a very favorable form with regard to clarity of solution and condition of the finished acetate in a relatively short space of time and particularly in the case of processes in which the amount of acetylating medium employed is reduced to a minimum.

My invention, therefore, consists in subjecting cellulose, preferably air dried to contain about 6 to 7% of residual moisture, such as may advantageously be prepared in the form of paper produced from pure cotton in a paper-making machine, to an acetylating process by treatment with acetic anhydride, acetic acid and a condensing agent such as sulphuric acid, and with a metallic catalyst consisting of a salt of chromium. The product of acetylation is soluble in acetone without the necessity for any further treatment with water or dilute acid.

By metallic catalyst, I mean a salt of chromium which is operative even when added in a very small quantity relatively to the weight of cellulose present, and in which it is the metal itself which appears to be the active agent and not the acid radical with which it is combined.

The following example illustrates the manner in which my process may be carried out in practice.

Example: 5 lbs. of acetic acid are mixed with 5 lbs. of acetic anhydride and then 0.2 lbs. of sulphuric acid are added with careful control of temperature which should not rise above about 15° C. 2.5 grams of chromium acetate are added to this mixture and then 2.5 lbs. of cellulose are introduced, and thoroughly mixed for the necessary time.

As the acetylation process proceeds, the temperature is kept below about 15° C. until a transparent viscous liquid free from fibres is obtained, and the mixing is stopped. The mixture is then maintained at a temperature of about 30° C. until a test sample shows that the cellulose acetate is freely soluble in acetone. This stage is reached very rapidly, the whole operation only requiring about 18 hours from start to finish.

The rate of the first stage of the acetylation can be controlled and retarded if necessary by the partial neutralization of the sulphuric acid present by means of occasional additions of sodium carbonate. These additions modify the heat evolutions of the reaction and so regulate its progress.

I have found by experiment that the catalyst may be added either in one addition and may consist of a single metallic salt, or that the admixture of the catalyst may take place in two or more stages.

The catalyst may be introduced into the solution by admixture therewith in the manner above described, or in the metallic form, when it will gradually pass into solution in the acetylating mixture.

Having now particularly described and ascertained the nature of my said invention, and in what manner the same is to be performed, I declare that what I claim is:—

1. A process for the production of cellulose acetate consisting in treating cellulose with a mixture of acetic acid, acetic anhydride and a condensing agent, and a metallic catalyst, consisting of a salt of chromium.

2. A process as claimed in claim 1, wherein the catalyst is added to the solution in stages.

3. A process as claimed in claim 1, wherein the catalyst is added in the metallic form and passes into solution during the process of acetylation.

LEONARD ANGELO LEVY.